United States Patent [19]

Biddle, III et al.

[11] 4,381,545

[45] Apr. 26, 1983

[54] CONTROL MEANS AND METHOD FOR POWDER BAGGING

[75] Inventors: Nicholas Biddle, III; Stephen R. Craig, both of Wilmington, Del.

[73] Assignee: E. I. Du Pont de Nemours and Company, Wilmington, Del.

[21] Appl. No.: 220,854

[22] Filed: Dec. 29, 1980

[51] Int. Cl.³ .............................................. B67D 5/30
[52] U.S. Cl. ................................... 364/479; 364/567; 222/63; 177/116
[58] Field of Search ..................... 364/479, 567, 510; 177/116, 119, 121, DIG. 3; 222/52, 55, 59, 63, 71, 76, 77

[56] References Cited

U.S. PATENT DOCUMENTS

| | | | |
|---|---|---|---|
| 3,498,395 | 3/1970 | Henry | 177/1 |
| 3,576,224 | 4/1971 | Susor | 177/116 X |
| 3,630,298 | 12/1971 | Orr et al. | 177/116 |
| 3,638,832 | 2/1972 | Sauber et al. | 222/63 X |
| 3,802,522 | 4/1974 | Thompson et al. | 177/121 |
| 3,828,869 | 8/1974 | Sellers | 177/116 X |
| 3,889,848 | 6/1975 | Ricciardi et al. | 222/58 |
| 3,945,448 | 3/1976 | Sellers | 177/119 X |
| 3,960,224 | 6/1976 | Silvers | 177/116 X |
| 3,985,266 | 10/1976 | Wright | 222/22 |
| 4,037,598 | 7/1977 | Georgi | 222/71 X |
| 4,054,784 | 10/1977 | Ricciardi et al. | 364/479 |
| 4,111,272 | 9/1978 | Ricciardi et al. | 177/50 |
| 4,111,336 | 9/1978 | Ward et al. | 364/479 X |
| 4,234,102 | 11/1980 | Spurgeon | 364/479 X |
| 4,276,999 | 7/1981 | Reichenberger | 364/479 X |

*Primary Examiner*—Edward J. Wise

[57] ABSTRACT

Means and method for automatically controlling a powder bagging machine, said powder bagging machine having a weighing means for measuring the quantity of powder dispensed, and a means for dispensing the powder into a container, said automatic control means comprising a comparator means for sensing deviations in weight as measured by said weighing means, a control means for analyzing said weight deviations and for controlling the dispensing means. The method of the present invention comprises operating said means so as to effect a multi-stage filling cycle, the first stage comprising operating said dispensing means at a predetermined high speed for a predetermined time, the second stage(s) comprising controlled rate(s) of deceleration of said dispensing means, and the optional last stage comprising operating said dispensing means at a predetermined low speed or at a low rate of deceleration from a predetermined low speed until the desired weight of powder is dispensed.

10 Claims, 4 Drawing Figures

CONTROL MEANS AND METHOD FOR POWDER BAGGING

TECHNICAL FIELD

This invention relates to a means and method for automatically controlling a powder bagging machine, typically a vertical-form-fill-seal powder bagging machine, to accurately, quickly and in a consistent weigh cycle, package a precise predetermined weight of particulate material. The present invention is particularly well suited to control a powder bagging apparatus operating on a loss-in-weight principle, such as that disclosed in co-pending U.S. patent application Ser. No. 220,852, filed simultaneously herewith by Craig, and may also be adapted to control a powder bagging apparatus operating on a gain-in-weight principle, such as that disclosed in U.S. Pat. No. 4,090,344, granted May 23, 1978 to Kelly.

BACKGROUND ART

Various control systems for automated powder bagging machines have been developed for the purpose of improving the accuracy and speed of the filling cycle. Such systems are typically adapted for use with conventional or modified vertical-form-fill-seal (VFFS) machines, but may be adapted for other types of powder bagging machines as well.

U.S. Pat. No. 3,498,395, granted Mar. 3, 1970 to Henry discloses one such system which is based upon an apparatus and method for detecting the direction for a desired feed rate correction in a high speed weighing operation and applying a fixed correction during a feed rate correction period of each cycle. The required correction is determined from the weights of previously formed packages. Corrections are made to the feed rate to keep the weighing cycle in timed relationship with the remainder of the machine.

With such an apparatus and method, there is a certain degree of error built in, for it is that error which is detected downstream and furnishes the basis for making the corrections to the feed rate. Furthermore, the desired objective is a substantially constant (presumably fast) feed rate. The apparatus and method of the present invention provide for variable feed rates which are adjusted during each bag-filling cycle to achieve as nearly as possible a perfect net weight in each bag. There is no built-in error.

U.S. Pat. No. 3,985,266, granted Oct. 12, 1976 to Wright discloses a digital feeder control unit which computes the weight of material delivered by the feeder. A high frequency pulse train is applied to a motor speed controller connected to the feeder motor. When a first preset weight has been delivered, this high frequency pulse train is discontinued and a lower frequency pulse train is applied to the motor speed controller so that the feeder motor is slowed. When a second preset weight has been delivered, the control system causes the feeder to stop.

Such a control system, however, is limited to two feed rates—high and dribble, and if the high feed rate fails to deliver at least approximately 98% of the desired finished weight, it will be necessary to deliver a large quantity of material at dribble speed, thus greatly extending the length of the fill cycle. In any event, the length of the fill cycle is not a constant and therefore requires either a bagging machine capable of adjusting the bagging rate or a bagging machine set so that there is considerable dead time in each fill cycle to allow for those instances where a long dribble time is required. The apparatus and method of the present invention provide for variable and multiple feed rates within each fill cycle to achieve the fastest, most accurate, most consistent dispensing of a predetermined weight of particulate material within a fill cycle of predetermined and brief duration.

U.S. Pat. Nos. 3,889,848; 4,054,784; and 4,111,272, granted June 17, 1975, Oct. 18, 1977, and Sept. 5, 1978, respectively each to Ricciardi et al. disclose an automatically controlled weigh feeding system including a container prefilled with a substance, a device for discharging the substance at a controllable rate, apparatus for weighing the container and its contents, and means for controlling the discharge in response to the sensed weight of the container and its contents.

Although the inventions of these Ricciardi patents represent considerable improvement over the Henry invention discussed above, in that these inventions provide for instantaneous correction of feed rate in response to variations from a standard rate of loss in weight of the hopper, rather than delayed correction of feed rate in response to variations from a standard weight of filled bags downstream, still these inventions have as their objective a substantially constant (presumably fast) feed rate. The Ricciardi inventions are, therefore, not designed for use with a VFFS machine operating with a series of discrete fill cycles. On the other hand, the apparatus and method of the present invention are directed at such VFFS machines. For optimum speed and accuracy, multiple and preferably variable feed rates are required.

DISCLOSURE OF THE INVENTION

The present invention relates to an apparatus and method for automatically controlling a powder bagging machine. More specifically, the present invention relates to an apparatus and method for controlling a powder bagging machine through a series of multi-stage filling cycles in order to achieve maximum accuracy in delivering a predetermined weight of particulate material to a package and doing so within a precise, brief predetermined, period of time to permit coordination with an automatic packaging machine, such as a vertical-form-fill-seal (VFFS) machine.

These and other objectives are achieved by the means and method of the present invention substantially as described hereinafter.

The present invention utilizes a multi-stage filling cycle to achieve a short cycle time as well as accurate package weight. In one embodiment, the first stage of the cycle is a fast bulk fill which deposits most of the package weight as fast as possible. The package is weighed at the end of this stage. In this same embodiment, the second stage is a controlled deceleration which varies from cycle to cycle based on the amount of material deposited in the first stage and is calculated so that the entire cycle will terminate at the proper time. In this same embodiment, the third stage is a preset dribble which brings the package to final weight.

In a preferred embodiment, the second stage in the embodiment described above, i.e., the single controlled deceleration, is replaced by a series of stages each of predetermined duration or each of a duration determined by the amount of particulate material deposited in the bag, each stage in this series being a discrete controlled deceleration, the particular deceleration rate determined by a weight measurement made at or just prior to the beginning of each such stage in the series.

Alternative embodiments include the following:

(a) Instead of using a constant predetermined dribble speed in the third stage, the particulate material can be delivered at a speed which is decreasing at a predetermined rate or at a rate which is determined by weight measurement at or just prior to the beginning of the third stage. This rate of decrease, whether or not predetermined, can be a straight line, i.e., constant rate of decrease, or can be any other desired shape, e.g., steep at first, then less steep, tangentially approaching zero velocity.

(b) Instead of using a plurality of second stages, each constituting a period of controlled deceleration, periods of constant velocity can be interspersed periodically, to provide opportunity for intermittent highly accurate weight measurements.

(c) The third stage as described in any of the embodiments above can be eliminated, i.e., the rate or rates of deceleration in the second stage or stages can be programmed to give or approach the desired total fill weight without resorting to a final dribble stage.

Control of feed rate in all embodiments of the present invention can be by means of a digital system which generates a pulse train whose frequency is proportional to the feed rate desired. This pulse train is input to a motor control device which governs the speed of the feed motor. The desired feed rate is calculated for each cycle by a microprocessor control unit which receives package weight information from a scale.

DESCRIPTION OF THE DRAWINGS

In FIG. 1 there are shown the various components of a loss-in-weight feeder adapted to be used in combination with the control system of the present invention. Hopper 13 is supported by means of support arms 14 on scale 15 which is, in turn, supported on external support beam 16. Hopper 13 terminates at its lower end in a cylindrical filler tube 17. Feed auger 18 is suspended from the top of the hopper 13 by means of shaft 19. Shaft 19 is connected to motor 20 which is, in turn, supported on the top of hopper 13. It should be noted that hopper 13, support arms 14, filler tube 17, auger 18, shaft 19 and motor 20 are completely supported on scale 15. Supply duct 21 connects hopper 13 to a source of bulk product (not shown). Bellows 22 isolates supply duct 21 from hopper 13 such that supply duct 21 does not affect the weight of the hopper as sensed by scale 15.

Figure 1:
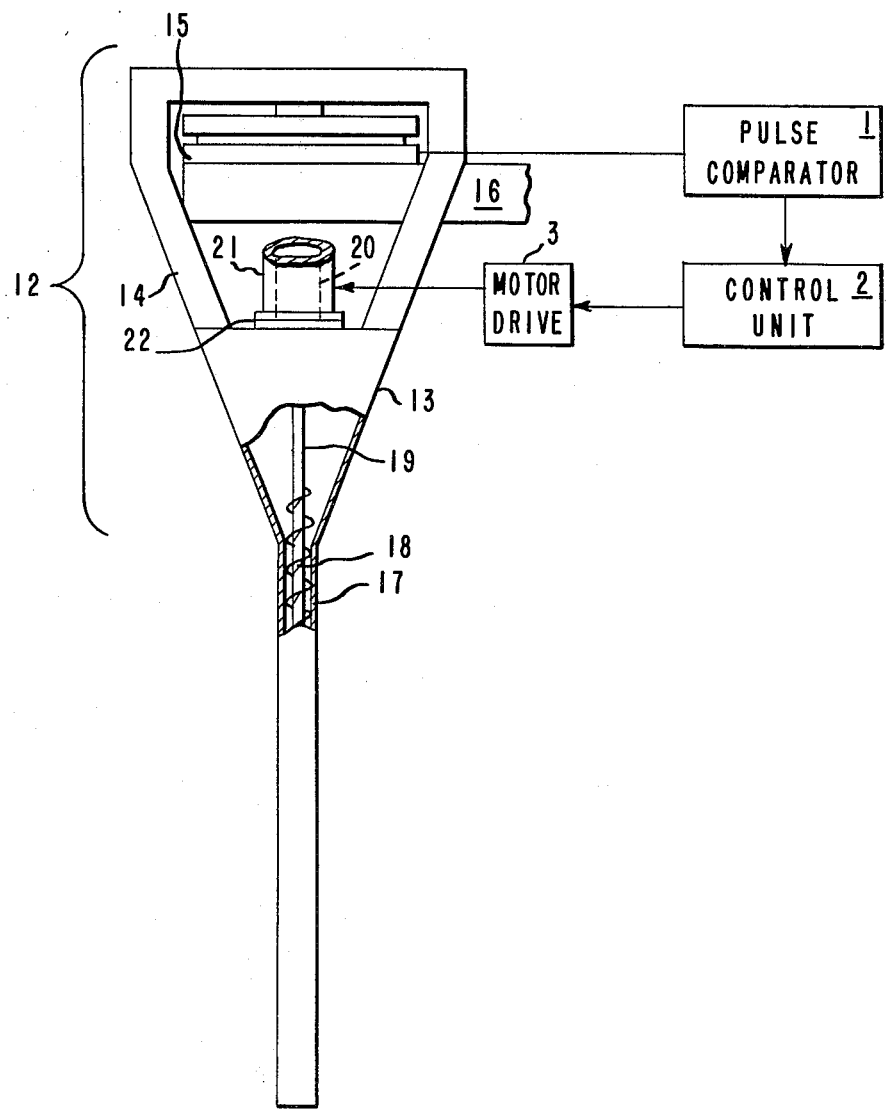
FIG. 1 is a front view partially in section of a bag filling machine such as is described in copending U.S. patent application Ser. No. 220,852, filed simultaneously herewith by Craig which machine has been adapted for operation in accordance with this invention.

Scale 15 can be any high speed, high resolution model, but satisfactory results have been obtained by using a digital mass transducer whose output is in the form of two alternating electrical signals, the ratio of whose frequencies is proportional to weight sensed by the scale. These signals can be converted to pulse trains by conventional square wave generators and are then entered into pulse comparator means 1 which counts the number of pulses occurring in the variable frequency pulse train over a period of time defined by a predetermined number of pulses in the essentially constant frequency pulse train. The total count of variable frequency pulses, then, is proportional to the average frequency of that pulse train over the counting period and, thus, is proportional to the average weight sensed by the scale over that time period. This number is input to control unit 2. The output of control unit 2 governs motor drive 3, which, in turn, determines the speed of motor 20. Motor 20 is conveniently a stepper motor and motor drive 3 a stepper motor drive whose output is in the form of electrical pulses which drive the stepper motor. Alternatively, motor 20 may be a d.c. servomotor with shaft encoder and motor drive 3 a servomotor drive. Control unit 2 is a microcomputer programmed to calculate the weight sensed by scale 15 based on input received from comparator 1, calculate the desired motor speed based on the motor speed profile shown in FIG. 3 or 4, and output appropriate control signals to motor drive 3.

Figure 3:
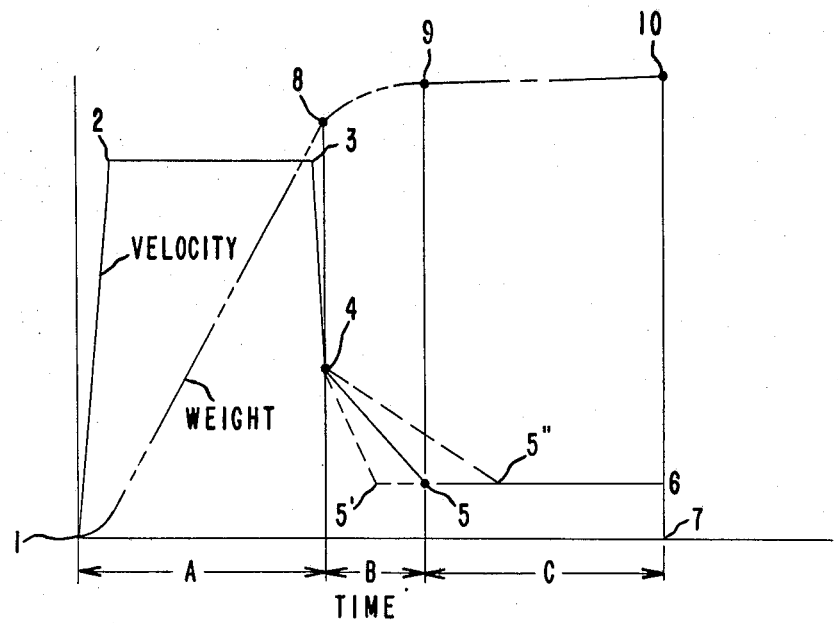
FIGS. 3 and 4 are time plots of the velocity of feed and total accumulated weight of feed during one complete fill cycle operated in accordance with two different embodiments of the present invention.

FIG. 3 is a time plot of the motor speed (or velocity) and total accumulated weight of feed over one cycle of the filler during which one package is filled with product in one embodiment of the present invention. The cycle includes three distinct stages, identified A, B and C in FIG. 3. Stage A is a rapid acceleration to maximum speed which is maintained for a preset interval followed by a rapid deceleration to an intermediate speed. Step B is a controlled slower deceleration to a slow speed. Step C is constant slow speed followed by shutoff at the end of the cycle.

In operation, a package to be filled is placed under the filler, preferably by an automatic conveyor or packaging machine. The system is actuated and control unit 2 computes the initial weight of hopper 13 with its load of particulate material from the output of comparator 1. Motor 20 is then started, point 1 in FIG. 3, and accelerated rapidly to a predetermined top speed, point 2; motor 20 is driven at top speed for a predetermined time, to point 3, through stage A of the motor speed profile, conveying most of the desired amount of product into the package. Motor 20 is rapidly decelerated to a predetermined intermediate speed, point 4, to conclude stage A. At or just prior to the beginning, point 4, of stage B, the weight of the hopper 13 and its remaining contents is measured by scale 15 and this information is fed to the control unit 2 via the comparator 1. For higher accuracy, several consecutive weight measurements and associated computations can be made at or just prior to the beginning of stage B. The control unit determines a deceleration rate for stage B, said rate being based on certain fixed parameters including (1) total time for the fill cycle, (2) motor speed for Step C, and (3) total weight of the material to be dispensed into the bag, and also based on the variable parameter, i.e., the weight of material dispensed as of the end of stage A. The bag weight at this point in the cycle will vary from cycle to cycle because of inaccuracies inherent in high speed operation as well as variations in density of the product. These weight values are compared with preset limits programmed into control unit 2 and the deceleration rate for stage B is selected. The profile selected is one which will complete stage B such that continued delivery of particulate material at a predetermined slow rate for the remainder of the fill cycle (stage C) will bring the total accumulated weight to the desired level. During stage B the motor is decelerated at the selected rate, the slope of the line from point 4 to point 5, in accordance with the selected profile until the preset speed of stage C is reached, point 5. The lines connecting point 4 and points 5' and 5" represent examples of alternative deceleration rates which could be selected, depending on the weight measurement made at or just prior to the beginning of stage B. When the preset speed of stage C is reached, point 5 (or 5', 5", etc.), the motor 20 is driven at a slow preset speed until the desired total weight of particulate material has been delivered to the bag. This can be determined by periodic weight measurements during stage C, or by pre-computing the duration of stage C based on weight measurements taken earlier during the fill cycle. In a preferred embodiment, control unit 2 computes the weight of the package at intervals during stage C until the package reaches the desired weight, point 6, at which time the motor is stopped, point 7. The system is now ready to begin another cycle.

Referring again to FIG. 3, the total accumulated weight of particulate material delivered to the bag is indicated by the line joining points 1, 8, 9 and 10. As can be seen, stage A is generally predetermined to be sufficient to deliver at least 90%, preferably 95% of the total weight.

Figure 4:
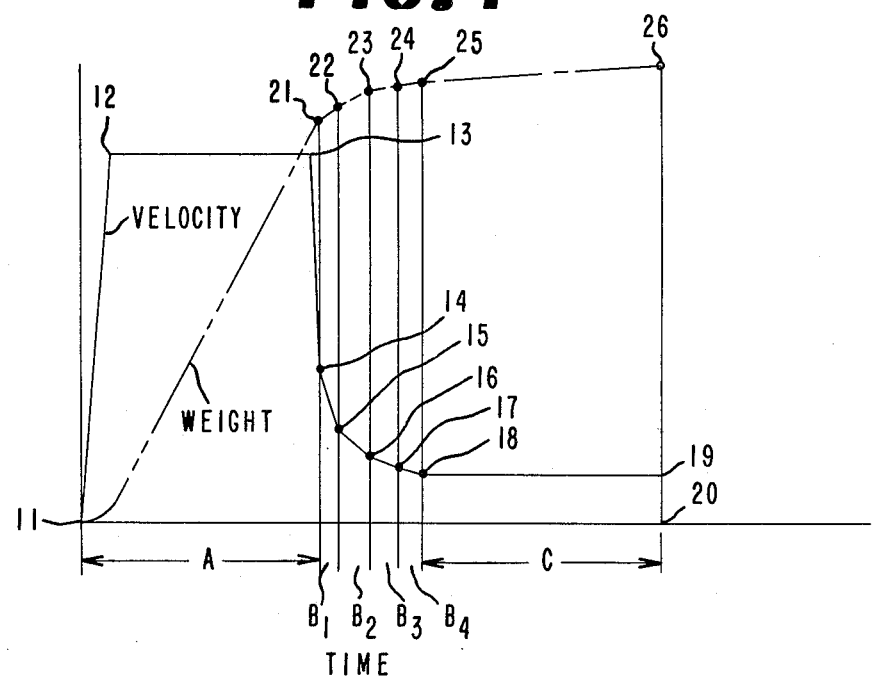

FIG. 4 is a time plot of the motor speed (or velocity) and total accumulated weight of feed over one cycle in a second, and more preferred embodiment of the present invention. In this embodiment, stage B of the previous embodiment is replaced by a series of stages $B_1$, $B_2$, $B_3$, $B_4$, etc. The deceleration rate in each of these steps is determined by the various fixed parameters mentioned above, and also by a weight measurement made at or just prior to each such stage in the series.

As in the previous embodiment, the system is actuated and control unit 2 computes the initial weight of the hopper 13 with its load of particulate material from the output of comparator 1. Motor 20 is then started, point 11, in FIG. 4, and accelerated rapidly to a predetermined top speed, point 12; motor 20 is driven at top speed for a predetermined time; until point 13. Motor 20 is then rapidly decelerated to a predetermined intermediate speed, point 14 to conclude stage A. At or just prior to the beginning of stage $B_1$, the weight of the hopper and its remaining contents is measured and this information is fed to control unit 2 via comparator 1. The control unit determines the rate of deceleration for stage $B_1$ based on the fixed parameters mentioned above, and also based on the weight of material dispensed as of the end of stage A and the number of stages $B_1$, $B_2$, $B_3$, $B_4$, etc. The weight at the end of stage A is compared with preset limits programmed into control unit 2 and the deceleration rate for stage $B_1$ is selected. Similarly, at or just prior to the beginning of each of the succeeding stages $B_2$, $B_3$, $B_4$, etc, the weight of the hopper and its remaining contents is measured, and the deceleration rate for each of such succeeding stages is selected accordingly, such that when all of such succeeding stages are complete, continued delivery of particulate material at a predetermined slow rate for the remainder of the fill cycle (stage C) will bring the total accumulated weight to the desired level.

The number and duration of such stages $B_1$, $B_2$, $B_3$, $B_4$, etc. used to effect the transition from intermediate speed, point 14, to slow speed, point 18, can be predetermined or can be determined by controller 2 based on the weight measurements taken at or just prior to each of such stages. Naturally, this preferred embodiment permits multiple corrections and adjustments during deceleration from intermediate speed to slow speed, and thus permits more accurate, smoother and faster operation. Accordingly various gradual changes in the deceleration rate are made at points 14, 15, 16, and 17 until the slow speed is reached, point 18, and stage C is begun. Motor 20 continues to operate at the preset slow speed until the desired weight is reached, point 19, at which time the motor is stopped, point 20. The total accumulated weight of particulate material delivered to the bag is indicated by the line joining points 11, 21, 22, 23, 24, 25, and 26.

The advantage of this system is that a more accurate package weight can be attained without increasing the maximum cycle time. The present system has the ability to choose a higher speed intermediate stage between the fast and slow stages so as to reach the slow stage with only a small amount of product to be added so that the slow stage takes a minimum time to complete. Conversely, if the weight of the package at the end of the first stage is unusually high, the second stage will be a rapid deceleration to a slow speed which brings the package to final weight and stops.

The following example illustrates the use and operation of the present invention, as well as the speed and accuracy that can be achieved with the present invention.

EXAMPLE

Figure 2:
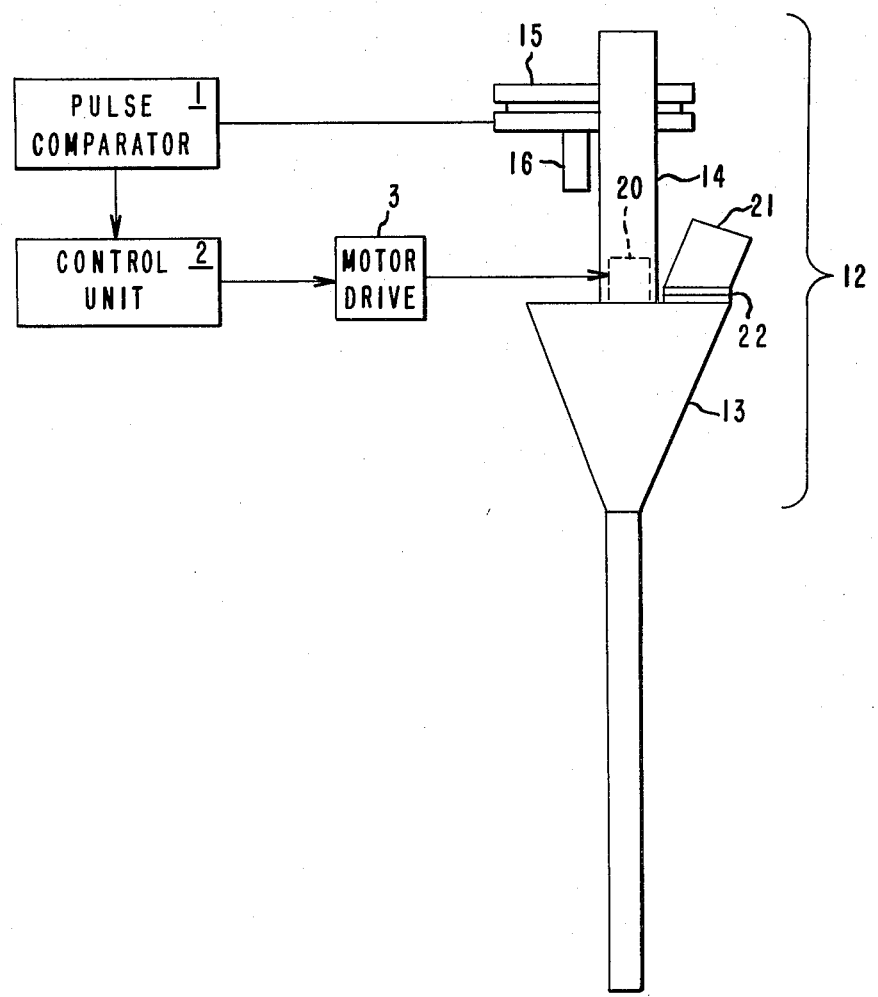
FIG. 2 is a side view of the same.

The apparatus shown in FIGS. 1 and 2 and described in detail above was used to achieve 40 fills using the velocity profile described below. The material being packaged was sticky, fine particles whose bulk density varied approximately 10%. The average weight for each fill was 2271 grams, with a standard deviation of 24.3 grams. The average time for each fill was 3.78 seconds with a standard deviation of 0.39 seconds.

| Stage | Elapsed Time | Motor Velocity (rpm) Beginning | End |
|---|---|---|---|
| 1 | 0.25 | 0 | 1100 |
| 2 | 1.10 | 1100 | 1100 |
| 3 | 1.46 | 1100 | 200 |
| 4 | 2.06 | 200 | 80 |
| 5 | 3.46 | 80 | 80–0 (pref. 80–60)[1] |
| 6 | 3.76 | 80–60[1] | 60 |
| 7 | 2 | 60 | 0 |

[1] Stage 5 ends at 0 rpm only when stage 4 results in overfill or near fill. In that case stages 6 and 7 are eliminated. In normal operation stage 5 ends between 80 and 60 depending on weight measurements made in stage 4.
[2] Final stop is when desired weight is achieved.

Stage 1 was a rapid acceleration from zero to a top speed of 1100 rpm. This acceleration was achieved in 0.25 seconds. Stage 2 was a constant, high speed fill for predetermined time (0.85 seconds). Stage 3 was a rapid (0.36 seconds) deceleration to a predetermined intermediate speed (200 rpm) which is low enough to permit accurate weight measurements. During stage 4 weight measurements were made while simultaneously effecting a slow (0.60 seconds) deceleration down to 80 rpm.

Up to this point, the entire velocity profile was predetermined, based on the characteristics of the material being packaged, the desired finish weight of each package, the desired finish time for each fill, and the limits imposed by the equipment used. The profile that was followed in each of the 40 fill cycles was determined by the controller based on the weight measurements made in stage 4.

If weight measurements indicated overfill at the end of stage 4, shutoff occurred immediately, and stages 5, 6 and 7 were eliminated.

If weight measurements indicated very near fill, stage 5 was a continuous deceleration to zero, the rate of deceleration determined by how much material still must be delivered to the package. Stages 6 and 7 were eliminated.

If weight measurements indicated normal fill, stage 5 was a continuous slow (1.4 seconds) deceleration from 80 rpm to a speed between 80 and 60 rpm, depending on the weight measurements made during stage 4.

Stage 6 was a rapid (0.30 seconds) deceleration from whatever was the speed at the end of stage 5 to the dribble speed of 60 rpm.

Stage 7 was continuous delivery of particulate material at a constant dribble speed while weight measurements were made. Stage 7 and the fill cycle terminated with shutoff when the desired fill weight was reached.

It should be understood that the foregoing example is merely illustrative of one embodiment and does not necessarily represent the most preferred embodiment for all end uses. For example, if a shorter fill cycle is required, stages 4 and 5 can be shortened considerably. If the product has greater variations in bulk density, stages 2, 3 and 4 can be shortened and stage 5 extended, giving less initial fill on average, weight measurements at a higher speed, and more time for stage 5 as would be necessary to compensate for the greater variation in the initial fill.

INDUSTRIAL APPLICABILITY

The means and method of the present invention are useful for the accurate, fast and efficient control automatic packaging machinery such as a vertical-form-fill-seal machine, such as those disclosed in co-pending U.S. patent application Ser. No. 220,852, filed simultaneously herewith by Craig and in U.S. Pat. No. 4,090,344.

BEST MODE

Although the best mode of the present invention may depend upon the particular machine being controlled, the material being packaged, the packaging material being used, the quantity of particulate material to be packaged per bag and the number of bags to be packaged per unit time, generally the most preferred embodiment of the present invention is as shown in FIG. 4 and described in detail on pages 10 and 11 of this application. Further, the means and method of the present invention is most conveniently and efficiently operated in combination with the apparatus disclosed in co-pending U.S. patent application Ser. No. 220,852 filed simultaneously herewith by Craig.

The present invention having been described and exemplified above and in FIGS. 1-4, it should be understood that variations thereof can be made therefrom by those of ordinary skill in the art without departing from the teachings of the present application. Accordingly, reference should be made to the claims following, rather than to the foregoing specification, to determine the scope of the present invention.

We claim:

1. A method for automatically controlling a powder bagging machine, said powder bagging machine having a weighing means for measuring the weight of powder dispensed and a means for dispensing the powder into a container, said method comprising the following steps in sequence:
    (a) operating said dispensing means during a first stage at a predetermined high speed for a predetermined time,
    (b) measuring the weight of powder dispensed during said first stage and comparing said measured weight with a desired total weight,
    (c) operating said dispensing means during a second stage at a decelerating speed, the rate of deceleration determined by the measurement taken in step (b).

2. The method of claim 1 wherein the second stage, step (c), is replaced by a plurality of deceleration stages in sequence, each of such stages comprising operating said dispensing means at a decelerating speed, the rate of deceleration in each of said stages determined by a weight measurement taken at the beginning of each of said deceleration stages and a comparison of each of said measurements with the desired total weight.

3. The method of claim 2 wherein at least one period of constant velocity is interspersed between two of said deceleration stages, and a weight measurement is taken during said period of constant velocity, which measurement is used to determine the deceleration in the deceleration stage immediately following said period of constant velocity.

4. The method of claim 2 wherein the second stage, step (c), continues until the desired total weight of powder has been dispensed.

5. The method of claim 1 wherein the weight measurement of step (b) is conducted after the dispensing means is slowed to a predetermined speed substantially lower than the high operating speed of step (a).

6. The method of claim 1 wherein said second stage continues until a predetermined low speed is reached, and the method further comprises a third stage during which said dispensing means is operated at the predetermined constant low speed until the desired total weight of powder has been dispensed.

7. The method of claim 6 wherein the second stage, step (c), is replaced by a plurality of deceleration stages in sequence, each of such stages comprising operating said dispensing means at a decelerating speed, the rate of deceleration in each of said stages determined by a weight measurement taken at the beginning of each of said deceleration stages and a comparison of each of said measurements with the desired total weight, said deceleration stages continuing until the dispensing speed reaches the predetermined low speed.

8. The method of claim 1 wherein said second stage continues until a predetermined low speed is reached, and the method further comprises a third stage during which said dispensing means is operated at a predetermined rate of deceleration until the desired total weight of powder has been dispensed.

9. The method of claim 1 wherein said second stage continues until a predetermined low speed is reached, and the method further comprises a third stage during which said dispensing means is operated at a rate of deceleration until the desired total weight of powder has been dispensed, said rate determined by a weight measurement taken at the beginning of said third stage and a comparison of said measurement with the desired total weight.

10. The method of claim 1 wherein the second stage, step (c), continues until the desired total weight of powder has been dispensed.

* * * * *